US 6,561,353 B2

(12) United States Patent
Levieux et al.

(10) Patent No.: US 6,561,353 B2
(45) Date of Patent: May 13, 2003

(54) APPARATUS AND METHOD FOR SECURING A VASE UPON A CAR SEAT

(75) Inventors: Deborah Levieux, 301 E. 1$^{st}$, Douglass, KS (US) 67039; Robyn Rouse, Wichita, KS (US)

(73) Assignee: Deborah Levieux, Douglass, KS (US)

( * ) Notice: Subject to any disclaimer, the term of this patent is extended or adjusted under 35 U.S.C. 154(b) by 159 days.

(21) Appl. No.: 09/872,631

(22) Filed: Jun. 1, 2001

(65) Prior Publication Data

US 2002/0179474 A1 Dec. 5, 2002

(51) Int. Cl.$^7$ ................................................. B65D 85/52
(52) U.S. Cl. ........................ 206/423; 206/490; 224/572
(58) Field of Search ................................. 206/423, 486, 206/487, 490, 592, 327; 53/431, 441; 47/39, 84; 224/402, 418, 572, 906, 924; 248/150, 152; 229/87.01, 183–185

(56) References Cited

U.S. PATENT DOCUMENTS

| | | | |
|---|---|---|---|
| 2,293,187 A | | 8/1942 | Becker et al. |
| 3,124,293 A | * | 3/1964 | Transport .................... 206/490 |
| 3,692,228 A | * | 9/1972 | Spiegel ........................ 206/486 |
| 4,069,917 A | | 1/1978 | Stollberg et al. |
| 4,078,658 A | | 3/1978 | Neiser |
| 4,184,595 A | * | 1/1980 | Wackerman ................ 206/423 |
| 4,209,092 A | * | 6/1980 | Jones .......................... 206/423 |
| 4,511,042 A | | 4/1985 | Wischusen et al. |
| D286,507 S | | 11/1986 | Drago et al. |
| 4,681,224 A | | 7/1987 | Niemann |
| 4,726,468 A | | 2/1988 | Hesser et al. |
| 4,794,728 A | | 1/1989 | Tsukada et al. |
| 4,819,803 A | | 4/1989 | Neiser |
| 5,011,070 A | | 4/1991 | Plunkett et al. |
| 5,060,798 A | | 10/1991 | Braastad |
| 5,301,871 A | | 4/1994 | Gross et al. |
| 5,687,503 A | | 11/1997 | D'Costa |
| 6,102,204 A | | 8/2000 | Castleberry et al. |

* cited by examiner

Primary Examiner—Luan K. Bui
(74) Attorney, Agent, or Firm—Kenneth H. Jack; Davis & Jack, LLC

(57) ABSTRACT

An apparatus and method for securing a vase upon a car seat, the apparatus and method including elements and steps of providing a vase holder, the vase holder, having a ceiling panel, including a forward end, a rearward end, a right end, a left end, and a vase receiving aperture, the vase holder further having a front wall panel hingedly attached to the forward end of ceiling panel, a rear wall panel hingedly attached to a rearward end of the ceiling panel, a floor panel hingedly attached to a lower end of the front wall panel, a car seat engaging panel hingedly attached to a rearward end of the rear wall panel, and a tab and slot attachment for connecting the rearward end of the floor panel to the lower end of the rear wall panel; downwardly pivoting the front and rear wall panels; rearwardly pivoting the floor panel; attaching the floor panel to the lower end of the rear panel; inserting the car seat engaging panel into a cleft within the car seat; and, inserting the vase into the vase receiving aperture.

11 Claims, 4 Drawing Sheets

APPARATUS AND METHOD FOR SECURING A VASE UPON A CAR SEAT

FIELD OF THE INVENTION

This invention relates to receptacles adapted for securing in an upright position vases, pots, and the like. More particularly, this invention relates to such receptacles having further adaptations for securing vases and pots upon car seats.

BACKGROUND OF THE INVENTION

Commercial retail floral shops commonly engage in over the counter sales to consumer customers of bouquets of flowers contained within glass or pottery vases. Typically, such customers will carry a vase containing a bouquet away from the flower shop in an automobile. Where the automobile transports a passenger in addition to a driver, the passenger may conveniently manually support the vase and bouquet in an upright position upon the automobile's seat. Where there is no passenger to perform such function, the vase and bouquet is difficultly supported in an upright position by the driver while occupied with driving.

The instant inventive apparatus and method provides means for supporting such bouquet and vase upon a automobile's seat without the assistance of a passenger, and without occupying and distracting the vehicle's driver. Such objectives are achieved by providing a panel board constructed vase receiving receptacle having a car seat engaging panel for securely positioning the receptacle, and vase and bouquet contained therein, upon a car seat.

BRIEF SUMMARY OF THE INVENTION

The vase holding apparatus of the instant inventive apparatus and method comprises a ceiling panel having a forward end, a rearward end, a right end, a left end, and having an annular inner edge, said edge defining a vase receiving aperture. Preferably, the ceiling panel is substantially square, and preferably the vase receiving aperture is circular, having a diameter between four inches and six inches for acceptance of common vase widths. A plurality of triangular vase centering panels are preferably pivotally attached to the annular inner edge of the vase receiving aperture by means of living hinges, such attachments arranging the vase centering panels so that they are radially spaced around the periphery of the vase receiving aperture, and so that they extend inwardly.

A further element of said apparatus comprises a front wall panel having a upper end, a lower end, a right end, and a left end; the upper end of the front wall panel being pivotally attached to the forward end of the ceiling panel by a living hinge. Preferably, the front wall panel is trapezoidal, having parallel upper and lower ends, the lower end being wider than the upper end, and the upper end being centered over the lower end.

A further element of said apparatus comprises a rear wall panel having an upper end, a lower end, a right end, and a left end, the upper end of the rear wall panel being pivotally attached to the rearward end of the ceiling panel by means of a living hinge. The rear wall panel preferably has a shape and a size identical to those of the front wall panel.

A further element of said apparatus comprises a first floor panel having a forward end and a rearward end; the forward end of the floor panel being pivotally attached to the lower end of the front wall panel by means of a living hinge. Preferably, the floor panel is substantially square.

A further element of said apparatus comprises a car seat engaging panel having a forward end and a rearward end, the car seat engaging panel being pivotally positioned at the lower end of the rear wall panel by means of a living hinge. The forward end of the car seat engaging panel may be suitably hingedly attached to the rearward end of the first floor panel. Suitably, though less desirably, where third and fourth floor panels as described below are provided, the forward end of the car seat engaging panel may be hingedly attached to either of the rearward ends of such floor panels. Preferably, the forward end of the car seat engaging panel is attached by a living hinge to the lower end of the rear wall panel. Preferably, the car seat engaging panel has a shape and size identical to those of the first floor panel.

A final structural element of the instant inventive vase holding apparatus comprises attaching means adapted for, upon downward pivoting motion of the forward and rear wall panels respectively about their hinged attachments to the ceiling panel, and upon rearward pivoting motion of the first floor panel about its hinged attachment to the lower end of the front wall panel, positioning the rearward end of the first floor panel at the lower end of the rear wall panel. Suitably, such attaching means may comprise "VELCRO" hook and loop pads which may be respectively attached, for example, to the rearward end of the first floor panel and to the lower end of the rear wall panel. Also suitably, such attaching means may comprise an adhesive. Suitably, though less desirably, said attaching means may comprise metal staples. Numerous other attaching means having varying levels of suitability may be utilized for positioning the rearward end of the first floor panel at the lower end of the rear wall panel, all such means falling within the scope of the invention. Preferably, said attaching means comprises a tab panel pivotally attached to the rearward end of the first floor panel by a living hinge, the tab panel being extendable into and through a tab receiving slot situated at the lower end of the rear wall panel. Preferably, such slot is partially co-extensive with the preferred living hinge attachment of the car seat engaging panel to the rear wall panel, such slot constituting a break in such living hinge.

Method steps which are preferably executed in assembly of the inventive vase holder comprise pivotal downward movements of the front and rear wall panels with respect to the ceiling panel, such motions preferably positioning said wall panels so that the side profile of the vase holder matches the preferred trapezoidal shapes of the front and rear wall panels. Thereafter, where the car seat engaging panel is hingedly attached to the lower end of the rear wall panel, the car seat engaging panel is extended rearwardly therefrom. The first floor panel is then rotated downwardly and rearwardly, and the attaching means is utilized to fixedly position the rearward end of the first floor panel at the lower end of the rear wall panel.

Execution of the above method steps configures the vase holder to include at least a ceiling, a floor, a front wall, and a rear wall, they together defining a vase receiving space, and to include a rearwardly extending car seat engaging panel. Upon such configuration, usage steps include rearward extension of the car seat engaging panel into a cleft which commonly exists at the juncture of a car seat bench and a car seat back rest. Such extension allows upholstered surfaces of the car seat at such cleft to securely hold such panel. Such engagement securely positions the vase holder (and a vase and bouquet contained therein) upon the upper seating surface of the car seat.

While many car seats form a cleft which will securely receive a single thickness of cardboard or other sheet material, some include a slight gap between the lower edge of the car seat's back rest and the upper surface of the rear of the car seat's bench. In order to allow such gapped clefts to securely receive the car seat engaging panel of the instant inventive vase holder, such panel preferably comprises a plurality of thickness adjusting panels connected in series by a plurality of living hinges, such panels and hinges allowing the rear end of the car seat engaging panel to be folded into a multiple thickness stratum for secure engagement with such gapped cleft.

Upon completion of the assembly and installation steps described above, a vase containing a bouquet of flowers may be inserted downwardly through the vase holder's vase receiving aperture, allowing the base of the vase to rest upon the upper surface of the first floor panel. Upon such insertion, the vase centering panels lining the vase receiving aperture prevent tipping of the vase with respect to the vase holder, while the engagement of the vase holder with the car seat prevents tipping of the entire assembly.

To enhance the structural integrity of the inventive vase holder and to enhance its aesthetic appearance, it is preferred that the vase holder further comprise left and right wall panels, having sizes and shapes identical to those of the front and rear wall panels. Preferably, the upper ends of the left and right wall panels are attached to the left and right ends of the ceiling panel by living hinges. The lower ends of the left and right wall panels are preferably secured in their downwardly extended positions by means of second and third floor panels, said panels preferably having shapes and sizes identical to that of the first floor panel. Preferably, left and right ends of the second and third floor panel are respectively hingedly attached to the lower ends of the left and right wall panels by means of living hinges. Attaching means similar to those described above may be suitably utilized for attaching the second and third floor panels to the first floor panel, or to each other. However, preferably, the second and third floor panels are laterally slotted, allowing them to interlock with each other in a position wherein they underlie the first floor panel or, alternately and preferably, in a position wherein they overlie the first floor panel.

For further enhanced structural integrity, and for prevention of internal tipping of a vase, a plurality of triangular fan joint panels are preferably provided, such panels spanning between the forward end of the left wall panel and the left end of the front wall panel, between the right end of the front wall panel and the forward end of the right wall panel, between the rear end of the right wall panel and the right end of the rear wall panel, and between the left end of the rear wall panel and the rear end of the left wall panel. The fan joint panels are preferably attached in series to each other and to said wall panels by living hinges. Preferably, such hinged attachments position the fan joint panels so that upon downward pivoting motions of the left, front, right, and rear wall panels, the fan joint panels extend inwardly forming a series of four inwardly extending vase engaging flanges. In operation of the vase holder, upon internal slippage of the base of a vase within the vase holder, a side wall of the vase may engage such inwardly extending flanges, further preventing tipping of the vase, and preventing spills.

In order to enhance the aesthetic appearance of the vase holder when not in use within an automobile, the car seat engaging panel is preferably forwardly underfolded and its rearward end (extending forwardly) is removably attached to the lower end of the front wall panel. To facilitate such removable attachment, tab and slot attaching means similar to those of the first floor panel and rear wall panel described above, are preferably provided.

The inventive vase holder may be fabricated from any thin and flexible panel material capable of having living hinges impressed thereon through application of scoring pressure and/or heat. Suitably, plastic sheet material or single layer cardboard material may be utilized. Preferably, the material utilized comprises corrugated cardboard having a thickness between one-eighth inches and one-fourth inches.

Accordingly, it is an object of the present invention to provide an apparatus and method for securing a vase upon a car seat wherein the apparatus comprises a vase securing structure integral with a car seat engaging member, and wherein the method includes steps of assembling the vase securing structure and insertion of the car seat engaging member into a car seat.

It is a further object of the present invention to provide such an apparatus and method further incorporating thickness adjustment panels facilitating secure engagement with a car seat.

It is a further object of the present invention to provide such an apparatus and method further incorporating inwardly extending vase engaging flanges.

It is a further object of the present invention to provide such an apparatus and method further incorporating structure and steps allowing the car seat engaging member to alternately function as a subfloor.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT OF THE INVENTION

Figure 1:
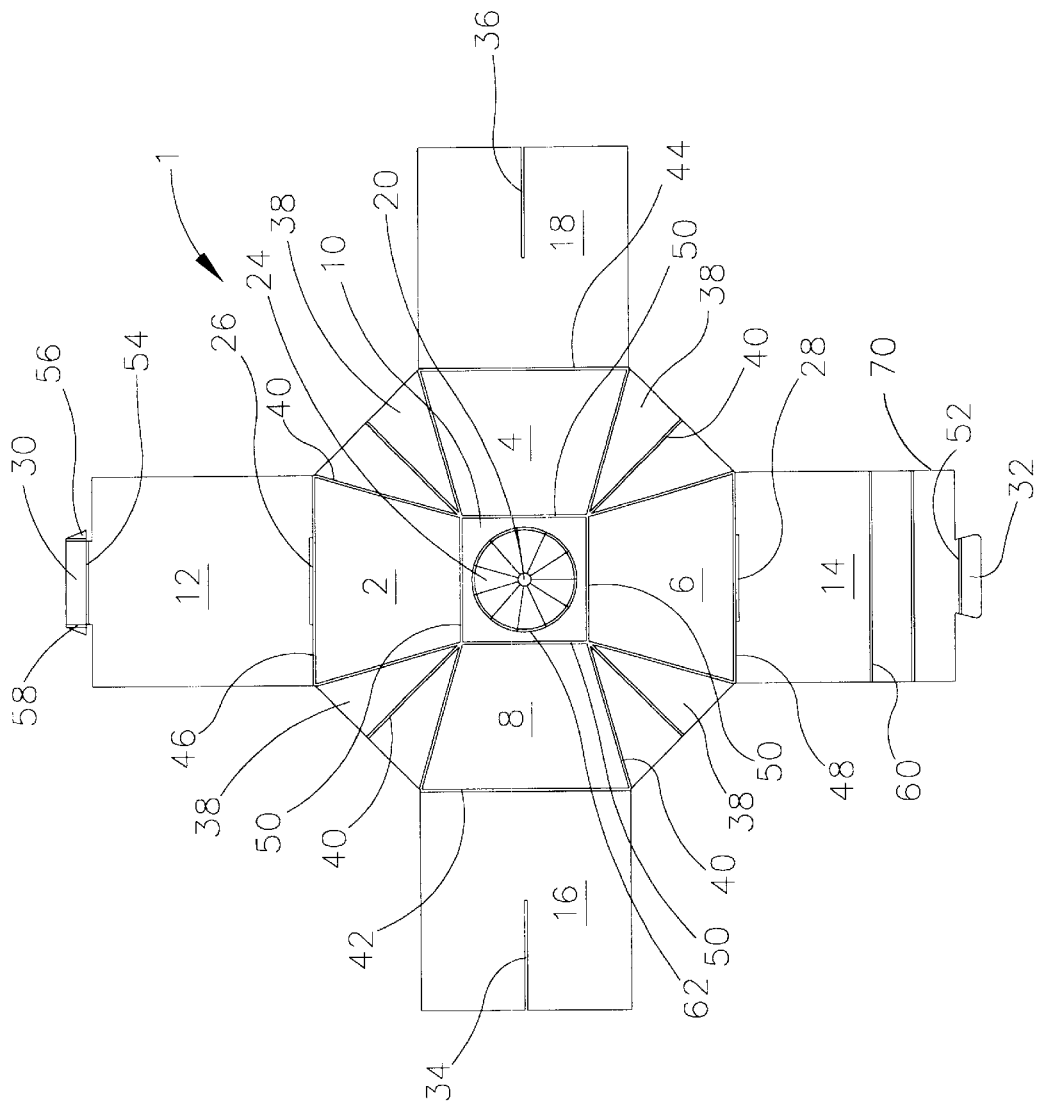
FIG. 1 is a plan view of the instant inventive vase holder, shown disassembled.
Figure 4:
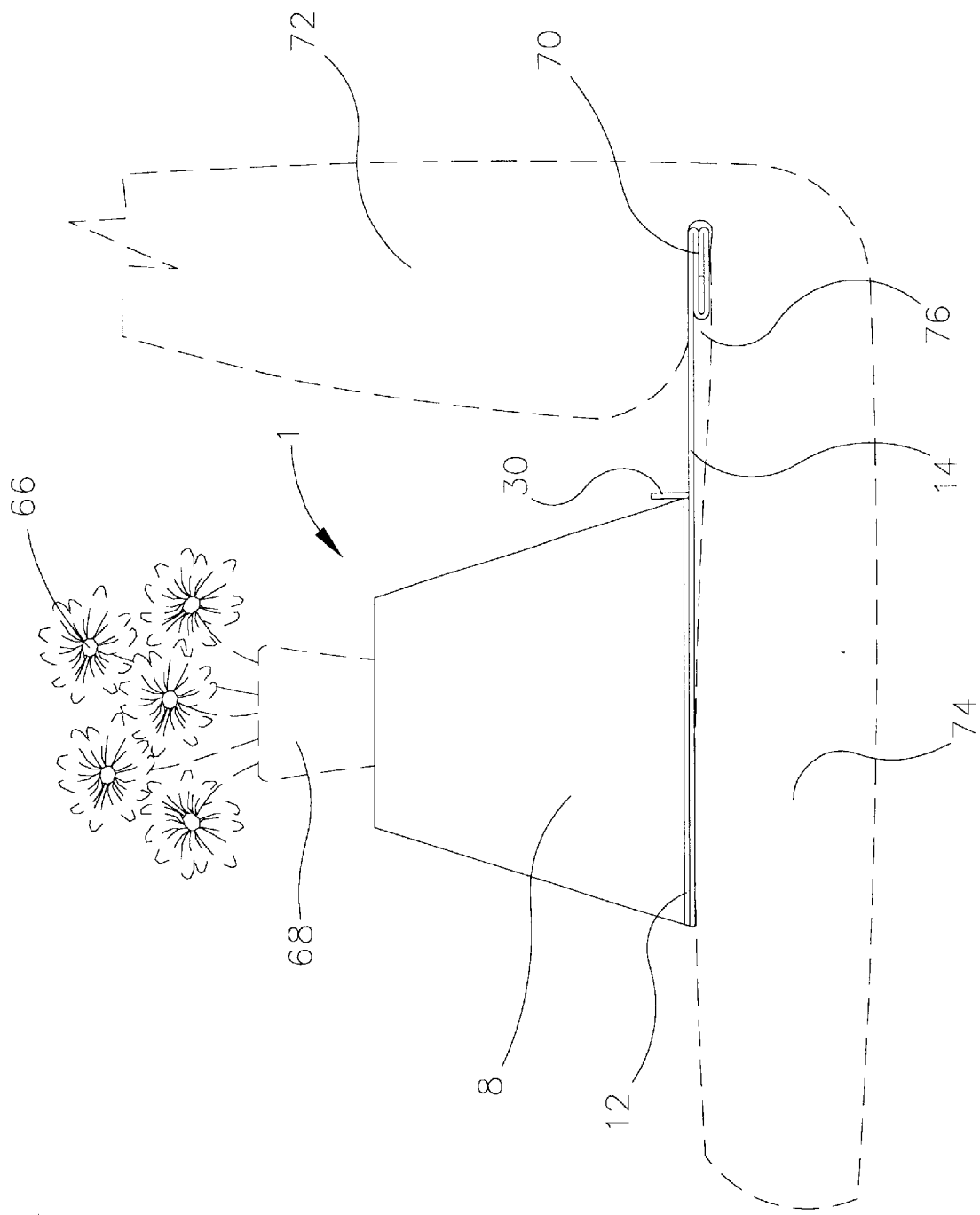
FIG. 4 is a side view of the instant inventive vase holder, shown installed upon a car seat.

Referring now to the drawings, and in particular to FIG. 1, the instant inventive vase holder is referred to generally by reference arrow 1. The vase holder 1 preferably consists of a single sheet of corrugated cardboard comprising the depicted plurality of panels conjoined by a plurality of living hinges. The living hinges are representationally depicted as closely spaced parallel lines. All orienting terms used below (e.g., forward, rearward, upper, lower, right, and left) are with reference to the vase holder as assembled and viewed in FIG. 2, and as installed upon a normally forwardly facing car seat as depicted in FIG. 4.

Referring to FIG. 1, living hinges 62 attach triangular vase centering panels 24 to ceiling panel 10 so that said panels 24 extend inwardly from the annular edge of vase receiving aperture 20. Trapezoidal front, right, rear, and left wall panels 2, 4, 6, and 8 are hingedly attached to the front, right, rear, and left ends of ceiling panel 10 by living hinges 50. Triangular fan joint panels 38 span between the left, right, forward, and rearward ends of wall panels 2, 4, 6, and 8, said fan joint panels being interconnected, and being connected to the said wall panels by living hinges 40. A first floor panel 12 is attached to front wall panel 2 by living hinge 46, a second floor panel 16 is attached to left wall panel 8 by living hinge 42; and a third wall panel 18 is attached to right wall panel 4 by living hinge 44. A car seat engaging panel 14 is attached to rear wall panel 6 by living hinge 48.

Referring further to FIG. 1, car seat engaging panel 14 comprises a pair of thickness adjustment panels 70, said panels being connected in series by living hinges 60. Second and third A floor panels 16 and 18 preferably have slots 34 and 36, said slots being engageable with each other. The forward end of the first floor panel 12 preferably comprises a tab panel 13, and tab lock panels 56, said tab and lock panels being interconnected and connected to floor panel 12 by living hinges 54 and 58. Tab panel 30 and tab lock panels 56 are lockingly engageable with slot 28. The car seat engaging panel 14 preferably further comprises a tab panel 32 connected by living hinge 52; said tab panel being removably engageable with slot 26.

Figure 2:
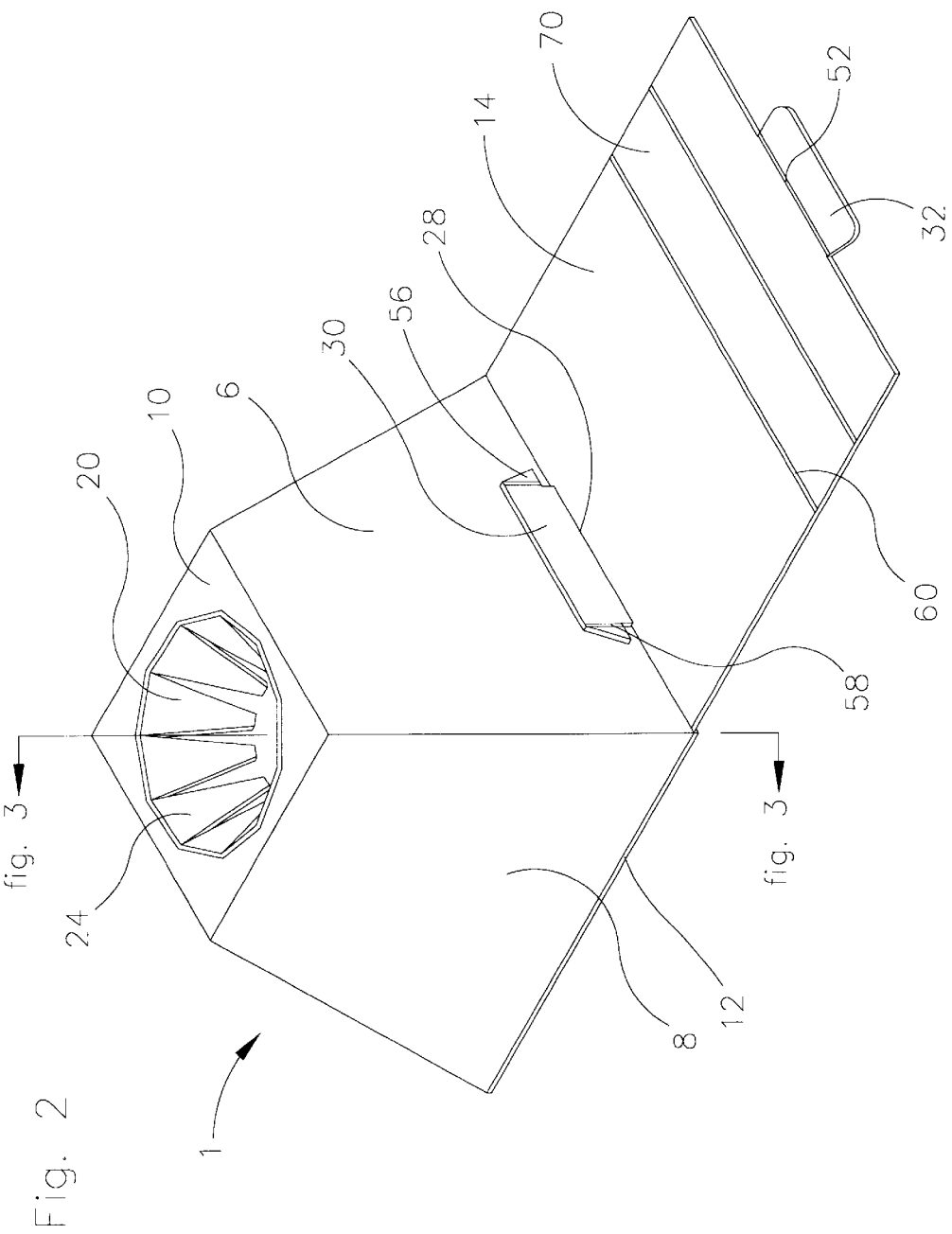
FIG. 2 is an isometric view of the instant inventive vase holder.

Referring simultaneously to FIGS. 1 and 2, the inventive vase holder is preferably assembled through steps of driving downwardly and inwardly each of the four sets of triangular fan joint panels 38 until the lateral edges of the trapezoidal wall panels 2, 4, 6, and 8 meet. Thereafter, second and third floor panels 16 and 18 are rightwardly and leftwardly underfolded and are engagingly positioned so that their slots 34 and 36 interlock. Thereafter, tab locking panels 56 are inwardly folded, first floor panel 12 is rearwardly underfolded, and tab panel 30 is upwardly extended through slot 28. Thereafter, tab locking panels 56 are outwardly extended, locking tab 30 and first floor panel 12 in place. Said locking actions are transmitted through the inwardly extended fan joint panels 38 to left and right wall panels 4 and 8, locking said panels in place, locking the left and right wall panels in place, and locking second and third floor panels 16 and 18 in their underlying positions.

Figure 3:
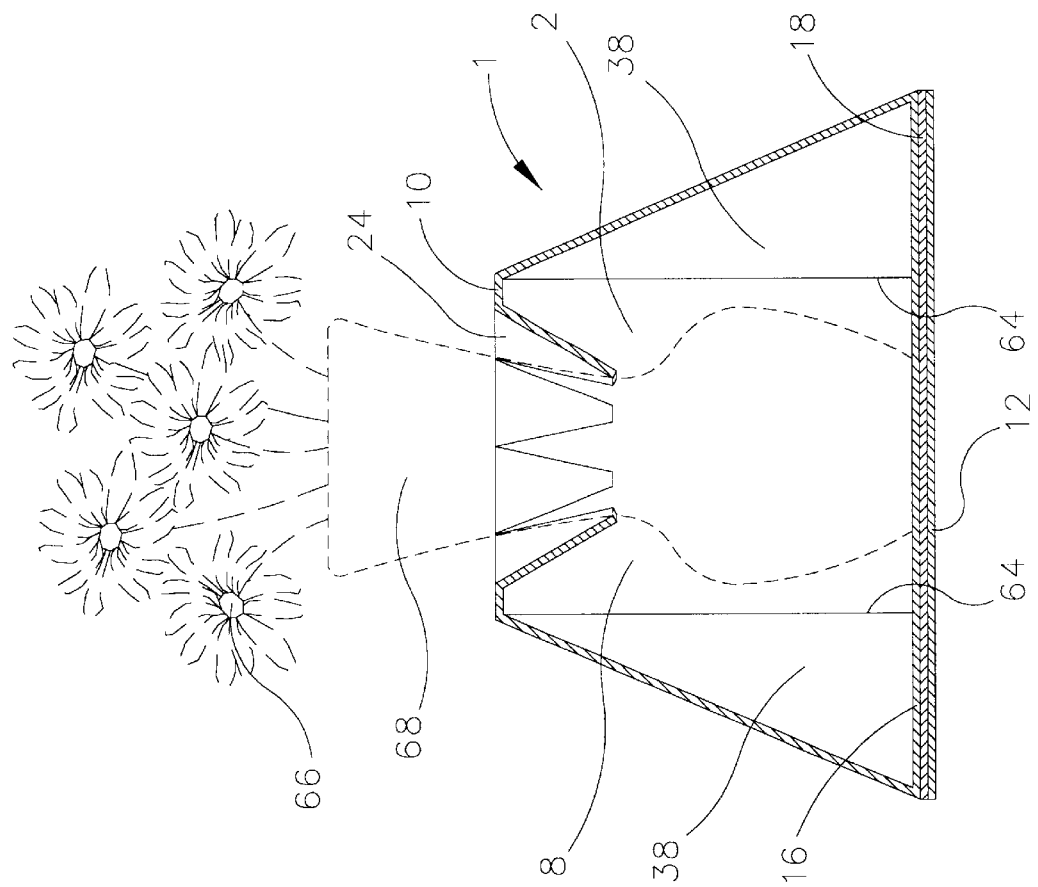
FIG. 3 is a sectional view as indicated in FIG. 2.

Referring simultaneously to FIGS. 2 and 4, thickness adjustment panels 70 and tab panel 32 may be folded as indicated to achieve a desired seat engaging thickness. Thereafter, said folded end of car seat engaging panel 14 may be extended rearwardly into a cleft 76 which commonly exists between the bench 74 and back rest 72 of a car seat. Upon such insertion, the vase holder 1 securely rests upon the upper seating surface of bench 74. Thereafter, a vase 68 containing flowers 66 is extended downwardly through aperture 20 until the base of the vase 68 rests upon the floor of the vase holder 1. Referring further simultaneously to FIG. 3, triangular vase centering panels 24 engage the neck of the vase 68, preventing tipping of the upper end of the vase, while inwardly extending flanges 64, formed of the triangular fan joint panels 38, prevent internal slippage of the base of the vase.

Referring simultaneously to all figures, upon completion of automobile transportation of the vase 68 and vase holder 1, such assembly may be manually forwardly moved, pulling car seat engaging panel 14 out of cleft 76. Thereafter, panels 70 and tab 52 are re-extended to the position depicted in FIG. 2. Thereafter, car seat engaging panel 14 may be forwardly underfolded, and tab 32 may be upwardly extended through slot 26 and thence into the interior space of the vase holder 1. Such positioning and attachment of the car seat engaging panel 14 allowing such panel to alternately function as a subfloor panel.

While the principles of the invention have been made clear in the above illustrative embodiment, those skilled in the art may make modifications in the structure, arrangement, portions, components, and method steps of the invention without departing from those principles.

Accordingly, it is intended that the description and drawings be interpreted as illustrative and not in the limiting sense, and that the invention be recognized as having a scope commensurate with the appended claims.

We claim:

1. A vase holder comprising:
   (a) a ceiling panel having a forward end, a rearward end, a right end, a left end, and having an inner edge, said edge defining said vase receiving aperture;
   (b) a front wall panel having an upper end, a lower end, a right end, and left end, the upper end of the front wall panel being attached to the forward end of ceiling panel by a first living hinge;
   (c) a rear wall panel having an upper end, a lower end, a right end, and a left end, the upper end of the rear wall panel being attached to the rearward end of the ceiling panel by a second living hinge;
   (d) a first floor panel having a forward end and a rearward end, the forward end of the first floor panel being attached to the lower end of the front wall panel by a third living hinge;
   (e) a car seat engaging panel having a forward end and a rearward end, the forward end of the car seat engaging panel being positioned at the lower end of the rear wall panel by a fourth living hinge; and,
   (f) first attaching means adapted for, upon downward pivoting motions of the front and rear wall panels respectively about the first and second living hinges, and upon rearward pivoting motion of the first floor panel about the third living hinge, positioning the rearward end of the first floor panel at the lower end of the rear wall panel.

2. The vase holder of claim 1 further comprising left and right wall panels, each having an upper end, a lower end, a forward end, and a rearward end; and further comprising fifth and sixth living hinges, said hinges respectively attaching the upper ends of the left and right wall panels to the left and right ends of the ceiling panel.

3. The vase holder of claim 2 further comprising second and third floor panels, each having a forward end, a rearward end, a left end, and a right end; and seventh and eighth living hinges respectively attaching the left and right ends of the second and third floor panels to the lower ends of the left and right wall panels.

4. The vase holder of claim 3 further comprising first, second, third, and fourth pluralities of fan joint panels, and ninth, tenth, eleventh, and twelfth pluralities of living hinges, said pluralities of living hinges connecting the first, second, third, and fourth pluralities of fan joint panels to the front, right, rear, and left wall panels so that they respectively connect the forward end of the left wall panel to the left end of the front wall panel, the right end of the front wall panel to the forward end of the right wall panel, the rearward end of the right wall panel to the right end of the rear wall panel, and the left end of the rear wall panel to the rearward end of the left wall panel.

5. The vase holder of claim 4 wherein the first attaching means comprises a tab and a tab receiving slot.

6. The vase holder of claim 4 further comprising second attaching means comprising interlocking slots extending through the second and third floor panels.

7. The vase holder of claim 4 wherein the car seat engaging panel comprises a plurality of thickness adjusting panels, and a thirteenth plurality of living hinges interconnecting said panels.

8. The vase holder of claim 6 further comprising third attaching means adapted for, upon forward pivoting motion of the car seat engaging panel about the fourth living hinge, attaching the rearward end of the car seat engaging panel to the lower end of the front wall panel.

9. The vase holder of claim 8 wherein the third attaching means comprises a tab and a tab receiving slot.

10. The vase holder of claim 4 further comprising a plurality of vase centering panels and a thirteenth plurality of living hinges, said hinges attaching said panels to the annular inner edge of the ceiling panel.

11. A method of securing a vase upon a car seat, the car seat comprising a bench and a back rest, the car seat having a cleft at a juncture of the bench and the back rest, the method comprising steps of:

(a) providing a vase holder comprising a ceiling panel having a forward end, a rearward end, a right end, a left end, and having an annular inner edge, said edge defining said vase receiving aperture; a front wall panel having an upper end, a lower end, a right end, and left end; a first living hinge attaching the upper end of the front wall panel to the forward end of ceiling panel; a rear wall panel having an upper end, a lower end, a right end, and a left end; a second living hinge attaching the upper end of the rear wall panel to the rearward end of the ceiling panel; a floor panel having a forward end and a rearward end; a third living hinge attaching the forward end of the floor panel to the lower end of the front wall panel; a car seat engaging panel having a forward end and a rearward end; a fourth living hinge positioning the forward end of the car seat engaging panel at the lower end of the rear wall panel; and attaching means adapted for, upon downward pivoting motion of the front and rear wall panels respectively about the first and second living hinges, and upon rearward pivoting motion of the floor panel about the third living hinge, positioning the rearward end of the floor panel at the lower end of the rear wall panel;

(b) downwardly pivoting the vase holder's forward and rear wall panels;

(c) rearwardly pivoting the vase holder's floor panel;

(d) operating the attaching means to position the rearward end of the vase holder's floor panel at the lower end of the vase holder's rear panel;

(e) inserting the rearward end of the car seat engaging panel into the car seat's cleft; and, (f) inserting the vase into the vase holder's vase receiving aperture.

* * * * *